US012770750B2

(12) United States Patent
Lesko

(10) Patent No.: US 12,770,750 B2
(45) Date of Patent: Oct. 20, 2026

(54) NUCLEAR INSTRUMENT REMOVAL SYSTEM FOR USE WITH PROCESSING A NUCLEAR INSTRUMENT, ASSOCIATED FEED AND CUT MODULE, AND METHOD OF PROCESSING A NUCLEAR INSTRUMENT

(71) Applicant: Hi Tech Solutions, LLC, Kennewick, WA (US)

(72) Inventor: Michael A. Lesko, Latrobe, PA (US)

(73) Assignee: Hi Tech Solutions, LLC, Kennewick, WA (US)

( * ) Notice: Subject to any disclaimer, the term of this patent is extended or adjusted under 35 U.S.C. 154(b) by 38 days.

(21) Appl. No.: 19/200,836

(22) Filed: May 7, 2025

(65) Prior Publication Data

US 2026/0142047 A1 May 21, 2026

Related U.S. Application Data

(60) Provisional application No. 63/721,529, filed on Nov. 17, 2024.

(51) Int. Cl.

| | |
|---|---|
| ***G21C 19/32*** | (2006.01) |
| ***G21C 19/20*** | (2006.01) |
| ***G21F 5/14*** | (2006.01) |
| *G21C 17/108* | (2006.01) |

(52) U.S. Cl.
CPC ........... *G21C 19/32* (2013.01); *G21C 19/207* (2013.01); *G21F 5/14* (2013.01); *G21C 17/108* (2013.01)

(58) Field of Classification Search
CPC ....... G21C 19/20; G21C 19/207; G21C 19/32
See application file for complete search history.

(56) References Cited

U.S. PATENT DOCUMENTS

| | | | | |
|---|---|---|---|---|
| 5,227,123 A * | 7/1993 | Baversten | G21C 19/207 83/930 |
| 2011/0026662 A1* | 2/2011 | di Bari | G21C 19/207 376/260 |
| 2014/0185728 A1* | 7/2014 | Gundrum | G21C 19/20 376/260 |

FOREIGN PATENT DOCUMENTS

| | | |
|---|---|---|
| CA | 2594966 A1 * | 12/2004 |
| JP | H07294689 A * | 11/1995 |
| JP | 2000338294 A * | 12/2000 |

(Continued)

OTHER PUBLICATIONS

Master-Lee Energy Services Corporation, "ICI Cutter System," 2022, pp. 1-6.

*Primary Examiner* — Sharon M Davis
(74) *Attorney, Agent, or Firm* — The Powers IP Law Firm

(57) ABSTRACT

A nuclear instrument removal system (NIRS) for use with processing a nuclear instrument is provided. The NIRS includes a control system and an instrument processing system configured for use with the control system. The instrument processing system includes a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly. The spool module includes a spool canister and a drive shaft associated with the canister. The drive shaft is configured to rotate about an axis in order to spool a cold portion of the nuclear instrument within the canister.

15 Claims, 18 Drawing Sheets

(56) References Cited

FOREIGN PATENT DOCUMENTS

WO WO-2017059833 A1 * 4/2017 ........... G21C 17/108

* cited by examiner

NUCLEAR INSTRUMENT REMOVAL SYSTEM FOR USE WITH PROCESSING A NUCLEAR INSTRUMENT, ASSOCIATED FEED AND CUT MODULE, AND METHOD OF PROCESSING A NUCLEAR INSTRUMENT

CROSS REFERENCE TO RELATED APPLICATION

This application claims priority to and claims the benefit of U.S. Provisional Patent Application Ser. No. 63/721,529, filed Nov. 17, 2024, and entitled "NUCLEAR INSTRUMENT REMOVAL SYSTEM AND ASSOCIATED METHOD," the contents of which are incorporated herein by reference in their entirety.

BACKGROUND

Nuclear energy, such as from nuclear power plants, is a proven and reliable source of clean baseload electricity. Keeping nuclear power plants running safely and efficiently is desirable.

Two of the most common types of nuclear reactors are Boiling Water Reactors (BWRs) and Pressurized Water Reactors (PWRs). In BWRs, a core of the nuclear reactor heats water, which turns to steam in order to drive a steam turbine. In PWRs, the core of the nuclear reactor heats water, which then exchanges heat with a low-pressure system, which turns water into steam in order to drive a turbine.

One system used with BWRs is a bottom entry disposal system (BEDS). The BEDS is used to remove and segment local power range monitors (LPRMs). Known BEDSs rely heavily on complex coding built into the system's programmable logic controller (PLC). One drawback of such a system is that procedural requirements of the LPRMs and operator skill are often not relied upon during operation of the BEDSs. Furthermore, maintenance and troubleshooting on these systems are overly cumbersome.

Another system used for a similar purpose as the BEDS is an in-core instrumentation (ICI) cutter system. However, unlike the BEDS, the ICI cutter system is exclusively used in PWRs to segment top-mounted ICIs which are used primarily in nuclear plants built by combustion engineering. One shortcoming of ICI cutter systems is their limited applicability, since there are relatively few combustion engineering designed nuclear plants in operation.

There is a need to improve on the BEDS and ICI cutter system in order to expand cutting applicability for in-core instrumentation. It is with respect to these and other considerations that the instant disclosure is concerned.

SUMMARY

In one aspect of the disclosed concept, a nuclear instrument removal system (NIRS) for use with processing a nuclear instrument is provided. The NIRS comprises a control system; and an instrument processing system configured for use with the control system, the instrument processing system comprising a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with canister, the drive shaft being configured to rotate about an axis in order to spool a cold portion of the nuclear instrument within the canister.

In another aspect, a feed and cut module is provided for use with processing a nuclear instrument. The feed and cut module comprises a mounting bracket; a drive mechanism coupled to the mounting bracket; a cutting assembly associated with the drive mechanism, the cutting assembly comprising a first cutting element, a second cutting element coupled to the first cutting element, and a housing coupled to the mounting plate and configured to house the first and second cutting elements, the first cutting element being slidably coupled to the housing and configured to slide between positions via the drive mechanism in order to cut a hot portion of the nuclear instrument into the small segments with a cutting edge of at least one of the first and second cutting elements; an actuation mechanism coupled to the mounting bracket; and a funnel coupled to the mounting bracket and configured to guide the nuclear instrument into the cutting assembly, the funnel being configured to move between a first position and a second position, the first position corresponding to the funnel being aligned with the first and second cutting elements, the funnel pivoting away from the first and second cutting elements responsive to actuation of the actuation mechanism when moving from the first position to the second position.

In another aspect of the disclosed concept, a method of processing a nuclear instrument with a nuclear instrument removal system (NIRS) is provided. The method comprises providing the aforementioned NIRS, receiving the nuclear instrument with the counter module; receiving the nuclear instrument with the feed and cut module after the nuclear instrument has passed through the counter module; receiving the nuclear instrument with the spool module after the nuclear instrument has passed through the feed and cut module; and rotating the drive shaft about an axis in order to spool a cold portion of the nuclear instrument within the canister.

DETAILED DESCRIPTION

As employed herein, the term "coupled" shall mean connected together either directly or via one or more intermediate parts or components.

As employed herein, the term "number" shall mean one or an integer greater than one (i.e., a plurality).

As employed herein, the term "cold portion" shall mean a non-irradiated extension portion (e.g., without limitation, a cable) of a nuclear instrument, such as a Local Power Range Monitor. In one non-limiting example, a "cold portion" has a length of between 250 and 325 inches, and in another non-limiting example, a "cold portion" has a length of between 275 and 300 inches, and in yet a further non-limiting example, a "cold portion" has a length of between 282 and 293 inches.

As employed herein, the term "hot portion" shall mean an irradiated detector portion of a nuclear instrument, such as a Local Power Range Monitor, wherein the "hot portion" is preferably configured to have a varying length due to reactor core locations in which the nuclear instrument is installed.

Figure 1:
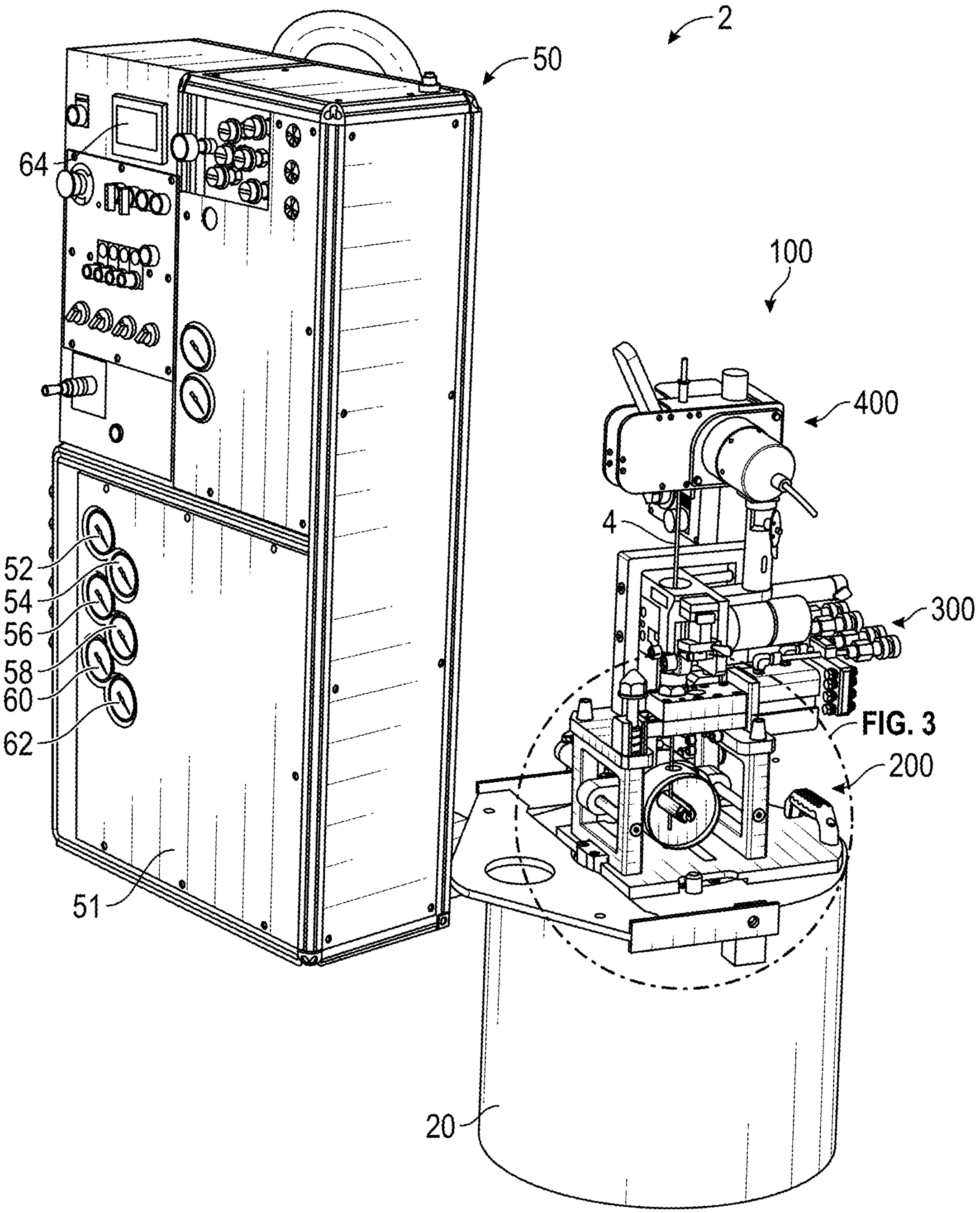
FIG. 1 is an isometric view of a nuclear instrument removal system (NIRS), in accordance with one non-limiting embodiment of the disclosed concept.
Figure 3A:
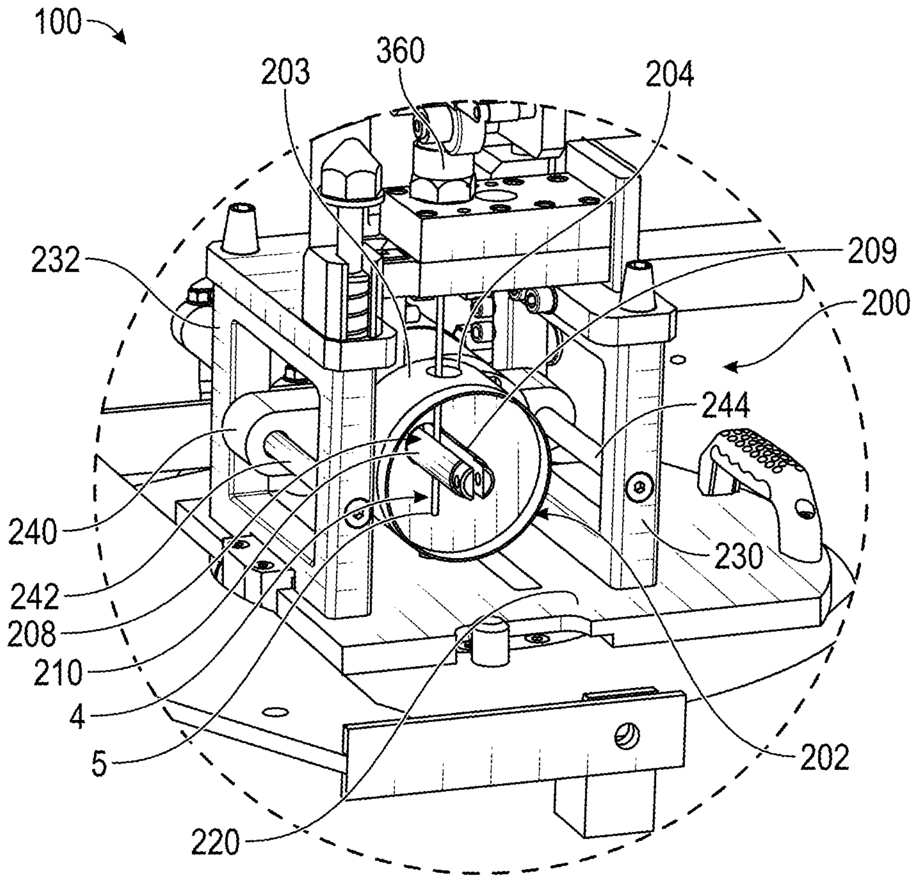
FIG. 3A is an enlarged view of a portion of the NIRS of FIG. 1.
Figure 4:
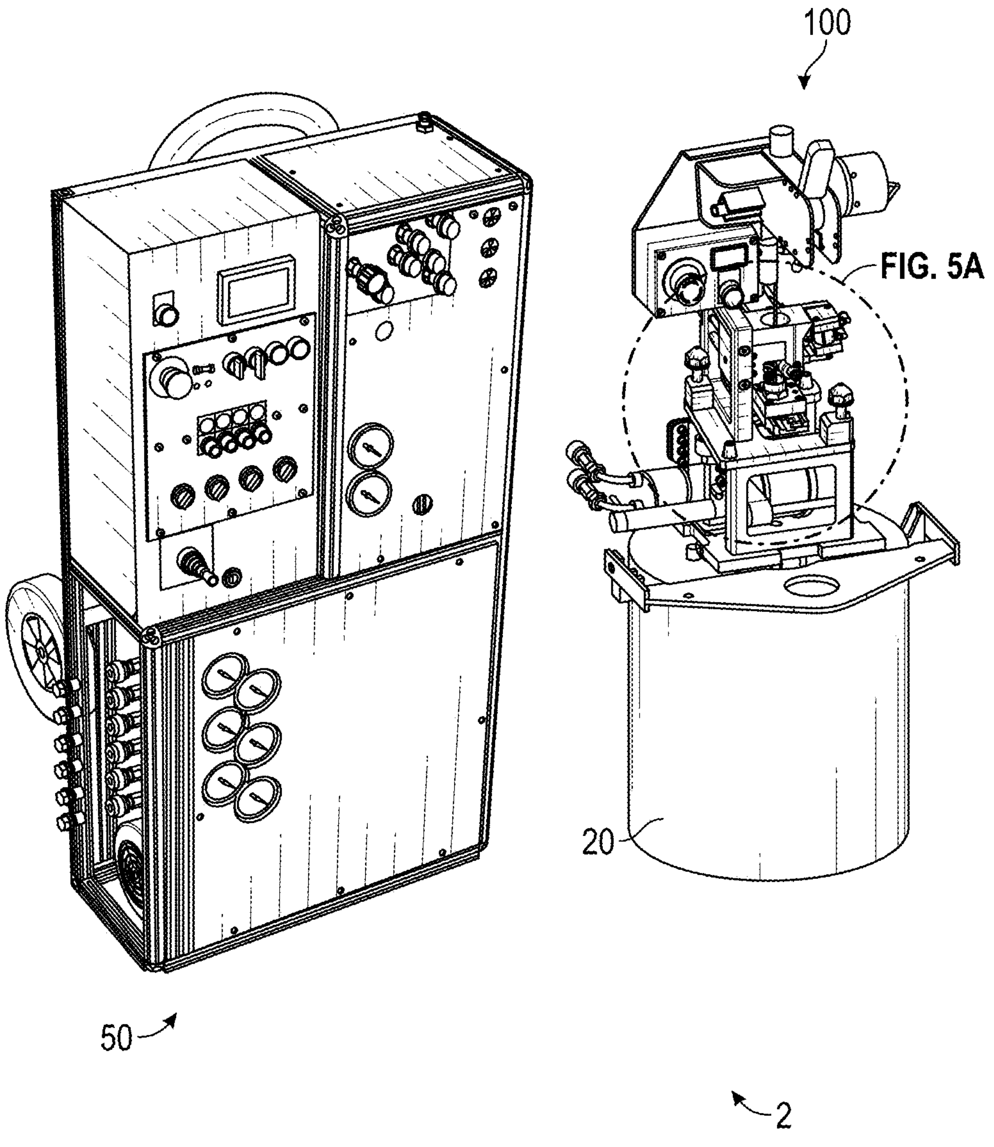
FIG. 4 is another isometric view of the NIRS of FIG. 1.
Figure 5A:
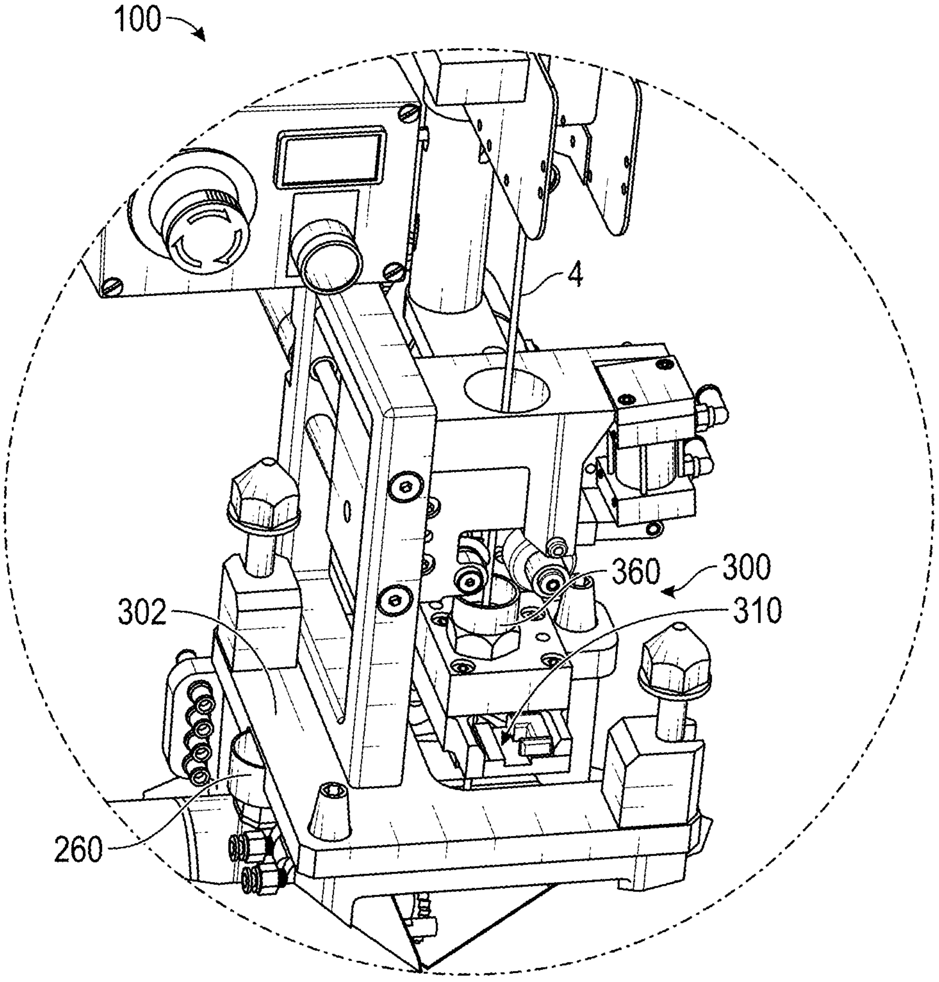
FIG. 5A is an enlarged view of a portion of the NIRS of FIG. 4.

Disclosed herein is a nuclear instrument removal system (NIRS) 2 for use with processing a nuclear instrument, such as a Local Power Range Monitor (LPRM) 4, shown in FIGS. 1 and 4, in accordance with one non-limiting embodiment of the disclosed concept. FIG. 3A shows an enlarged view of a portion of FIG. 1, and FIG. 5A shows an enlarged view of a portion of FIG. 4.

In operation, the NIRS 2 is used to process the LPRM 4, which is partially shown in the FIGS., and other LPRMs (not shown) of a nuclear reactor, each of which may be accessed from underneath the reactor vessel, and be manually lowered into the NIRS 2. The purpose of the NIRS 2 is to provide a means of processing and disposing of the irradiated portion of the LPRM 4. The LPRM 4, and portions of its cable length, become highly radioactive and must be handled, and disposed of, remotely to ensure radiological safety for all personnel.

As will be discussed in greater detail below, the NIRS 2 advantageously expands cutting applicability for all in-core instrumentation in both PWR and BWR plants. This includes cutting of the LPRM 4, ICIs, and Flux Thimbles (i.e., in-core instrumentation tubes for known PWRs, not shown). In one example, as will be discussed, the NIRS 2 improves over known BEDSs (not shown) by more efficiently processing "cold" (i.e., relatively low dose) sections of the LPRM 4, by providing for ease of maintenance and troubleshooting, and by better facilitating handling of the NIRS 2, at least by virtue of its lightweight design. Furthermore, the NIRS 2 improves over known ICI cutter systems (not shown) in that the NIRS 2 advantageously includes design simplification for ease of machineability and intuitive blade changeout tooling.

As shown in FIG. 1, the NIRS 2 includes a programmable logic control system 50 and an instrument processing system 100 configured for use with the control system 50. The control system 50 is preferably a portable unit that is mounted on a wheeled Dolley, meaning the entire control system 50 may readily be wheeled about a job site and be spaced apart from the instrument processing system 100. Power requirements for the control system 50 may be, in one example, a 220 VAC 30-amp single phase dedicated electrical circuit and 120 PSIG 2 CFM pneumatic supply. The control system 50 preferably houses controls for the different modules of the instrument processing system 100. For example, the control system 50 may include a housing 51, a programmable logic controller located within the housing 51, various control buttons (e.g., cut extend button 52, a cut retract button 54, a first feed motor button 56, a second feed motor button 58, a spool button 60, and a system pressure button 62) electrically connected to the programmable logic controller and configured to be connected to the instrument processing system 100 by a wireless connection and/or an electrical connection, and such that the control system 50 is configured to independently control operation of each of a counter module 400, a feed and cut module 300, and a spool module 200 of the instrument processing system 100. Furthermore, the control system 50 also includes a display 64 electrically connected to the programmable logic controller.

Figure 2:
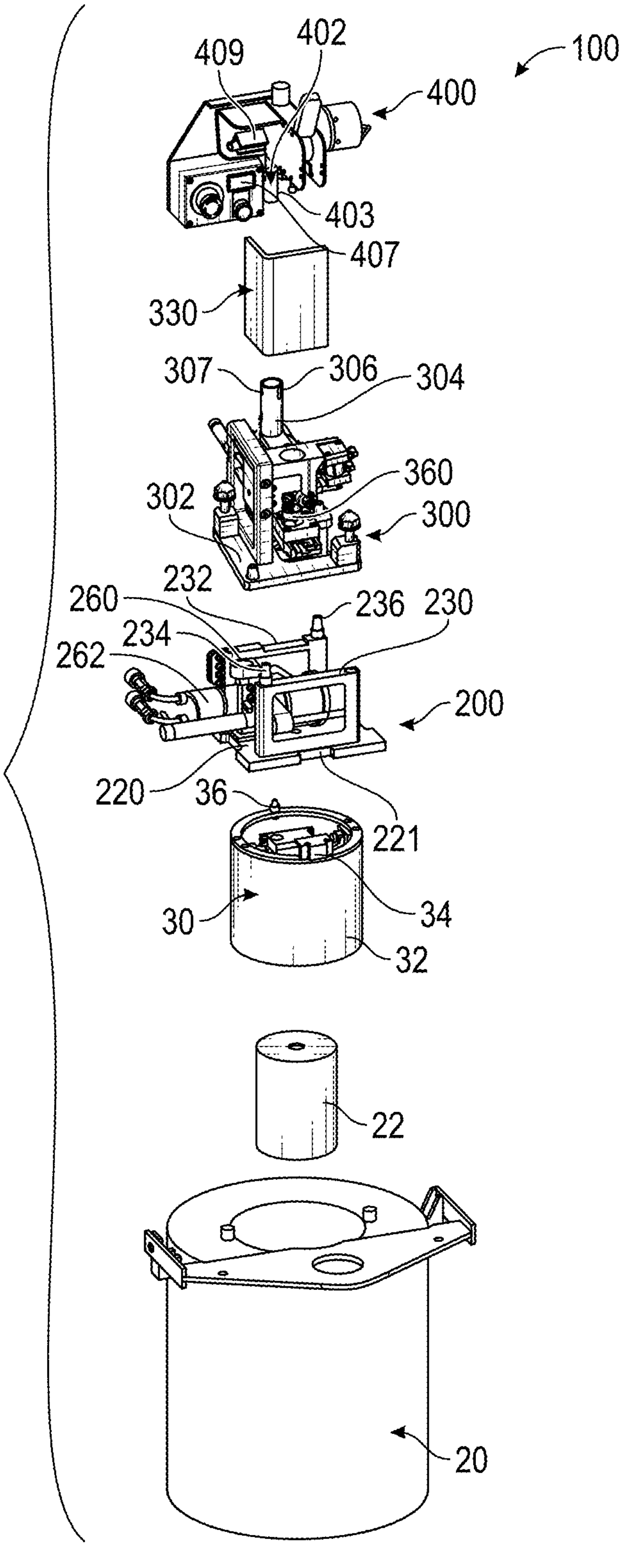
FIG. 2 is an exploded isometric view of an instrument processing system of the NIRS of FIG. 1, shown as employed with a cask plug, a canister, and a cask.

In one example, the NIRS 2 is configured for use with a cask 20, which may be used to transport disposed of portions of the irradiated LPRM 4. FIG. 2 shows an exploded isometric view of the instrument processing system 100, as employed with the cask 20, a drop out canister 22, and a cask plug 30. In operation, the drop out canister 22 is received within the cask 20 in order to receive cut items of the LPRM 4, as will be discussed below. Furthermore, the cask plug 30 is configured to be located on top of the drop out canister 22 in order to guide the cut sections of the LPRM 4 into the drop out canister 22. The cask plug 30 is also configured to shield radiation emitted by the LPRM 4 from the users of the NIRS 2. For example, the radiation, or shine, given off by the LPRM 4 is configured to rise through the drop out canister 22. However, the cask plug 30 desirably covers a hole in the drop out canister 22, so that when the cask 20 is transported, workers will be covered.

Continuing to refer to FIG. 2, the instrument processing system 100 includes a spool module 200, a feed and cut module 300, and a counter module 400. The three modules 200,300,400 of the instrument processing system 100 work together with the control system 50 to process the LPRM 4 by first spooling a "cold" part of the LPRM 4, and then cutting and segmenting a "hot" (i.e., high dose) part of the LPRM 4. During operation, each of the modules 200,300, 400 are configured to operate independently of one another. That is, the counter module 400 can preferably count the length of the LPRM 4 without being connected to either of the other two modules 200,300, and the spool and feed and cut modules 200,300 can also operate independent of each other and the counter module 400. In this manner, as will be discussed below, this advantageously allows the feed and cut module 300 to, for example and without limitation, be employed with a relatively large retractable funnel 390, as opposed today's art in which small funnels are fixedly connected with modules, thereby making alignment of nuclear instruments rather difficult. During cutting of the LPRM 4, a cover 330 of the feed and cut module 300 may protect operators against chip ejection during the cutting process.

Furthermore, during processing of the LPRM 4, the control system 50 contains an interface for a worker to control operation of the instrument processing system 100. The control system 50 may be positioned a predetermined distance from the instrument processing system 100, in one example the distance being at least 50 feet, and positioned in this manner for radiological safety precautions.

The NIRS 2 can be set up to cut the LPRM 4 using the control system 50 at any length segments, preferably being between 1-3 inches, in one example between 1.9-2.1 inch segments. To initiate the processing and disposal operation, the LPRM 4 is cut well ahead of the irradiated portion just above the pilot using a pair of hand cutters. The remaining portion of the LPRM 4, which is still located in the reactor vessel, contains the irradiated portion of the cable and LPRM 4.

In operation, the instrument processing system 100 is desirably configured for use with the cask 20, the drop out canister 22, and the cask plug 30 in a quick and reliable manner, as compared with known technologies (not shown). In order to use the instrument processing system 100, a worker can first removably mount the spool module 200 to the cask plug 30, then mount the feed and cut module 300 to the spool module 200, and then mount the counter module 400 to the feed and cut module 300. The whole process can be done in relatively little time. In one example, it will be appreciated that, because of the lightweight nature of the instrument processing system 100, the steps of securing the spool module 200 to the cask plug 30, securing the feed and cut module 300 to the spool module 200, and securing the counter module 400 to the feed and cut module 300, may be performed manually (i.e., without the aid of separate mechanical apparatus).

More specifically, the cask plug 30 may have a body 32, which may be cylindrical-shaped, and a mounting structure (e.g., L-shaped mounting structure 34) extending from and/or coupled to a top of the body 32, and a protrusion (e.g., pin member 36) extending from and/or coupled to a top of the body 32 and positioned, in non-limiting example, opposite the mounting structure 34. Furthermore, as shown in FIG. 2, the spool module 200 preferably includes a mounting plate 220 having a grooved region 221. In operation, the spool module 200 may easily be lowered onto the top of the cask plug 30, with the L-shaped mounting structure 34 first secured over and extending into the grooved region 221 of the mounting plate 220. That is, the mounting plate 220 is configured to be mounted to the cask assembly (e.g., the cask 20, the canister 22, and the cask plug 30). Subsequently, the spool module 200 may be lowered further onto the cask plug 30 until the pin member 36 extends into an opening (i.e., through hole or bore, detent region, or the like) of the mounting plate 220. In this manner, the spool module 200 is reliably secured to the cask plug 30 in a transverse dimension.

Next, the feed and cut module 300 may be lowered onto and removably coupled to the spool module 200. Continuing to refer to FIG. 2, the spool module 200 further includes first and second support brackets 230,232 coupled to the mounting plate 220, as well as corresponding protrusions (e.g., pin members 234,236) extending from and/or being coupled to the at least one of the support brackets 230,232 (i.e., preferably each of the support brackets 230,232). The first and second support brackets 230,232 are configured to be located perpendicular with respect to the mounting plate 220. Accordingly, the feed and cut module 300 may be lowered onto the spool module 200 by locating openings (i.e., through holes) of a mounting plate 302 of the feed and cut module 302 with the pin members 234,236, such that the pin members 234,236 extend through these through holes in order to secure the feed and cut module 300 on the spool module 200 in a transverse dimension.

Figure 6:
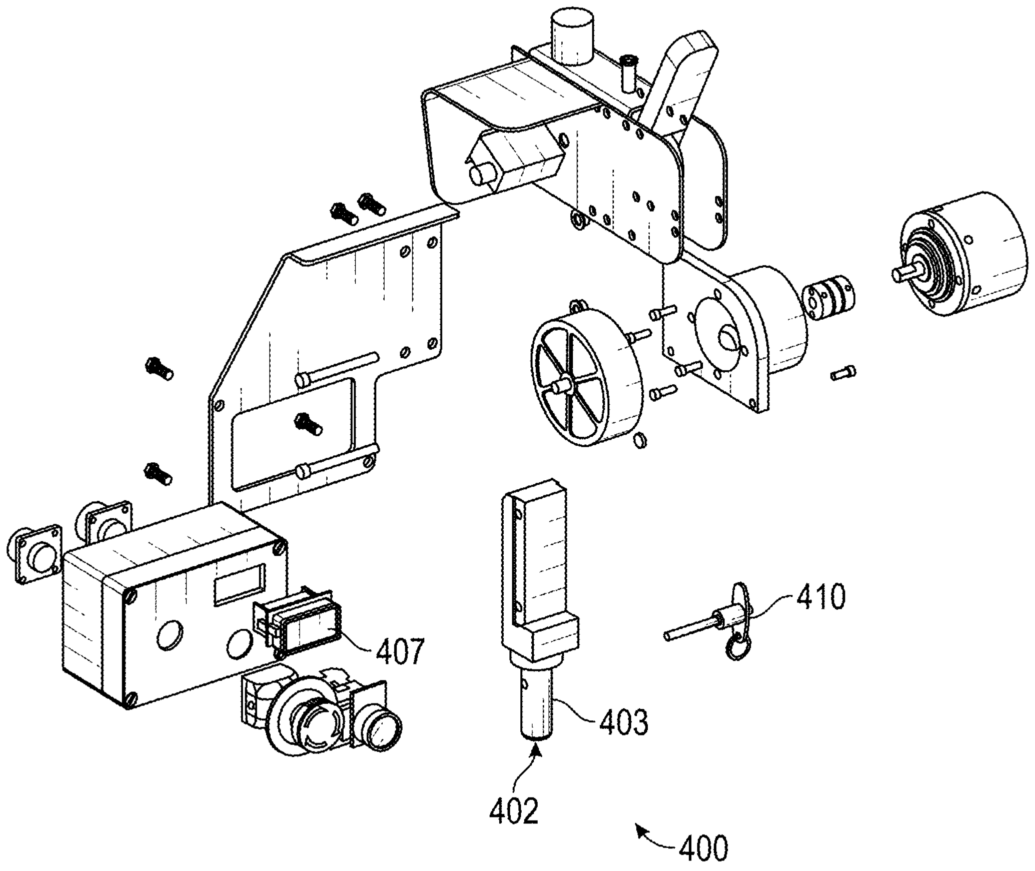
FIG. 6 is an exploded isometric view of a counter module for the instrument processing system of the NIRS of FIG. 4.

Finally, the counter module 400 may be reliably lowered onto and removably coupled to the feed and cut module 300. More specifically, the feed and cut module 300, which is shown in more detail in FIGS. 7A and 7B, preferably includes an at least partially tubular-shaped coupling member 304 coupled to the mounting plate 302, and the counter module 400, which is shown in more detail in FIG. 6, preferably includes a guide member 402 which has a shaft portion 403. In one example, the shaft portion 403 of the counter module 400 may be manually lowered into an opening of the coupling member 304. Subsequently, a pin member 410 may be inserted through the shaft portion 403, and also through a pair of opposing slots 306,307 (FIG. 2) of the coupling member 304. In this manner, the counter module 400 is configured to be removably coupled to the feed and cut module 300.

Once the instrument processing system 100 is positioned on the cask 20, the drop out canister 22, and the cask plug 30, processing of the LPRM 4 may commence with the LPRM 4 being fed through the counter module 400, through the feed and cut module 300, and into the spool module 200. This may be done by an operator manually directing the LPRM 4 through a series of funnels of the modules 200, 300,400. A final position of the LPRM 4 during initial sequencing of the NIRS 2 is depicted in FIG. 3A. As the LPRM 4 is initially fed into the spool module 200, the LPRM 4 is fed into a spool drive, discussed below. This will engage the LPRM 4 with an encoder wheel, drive system wheels, and also a canister (e.g., sacrificial spool canister 202).

Figure 3C:
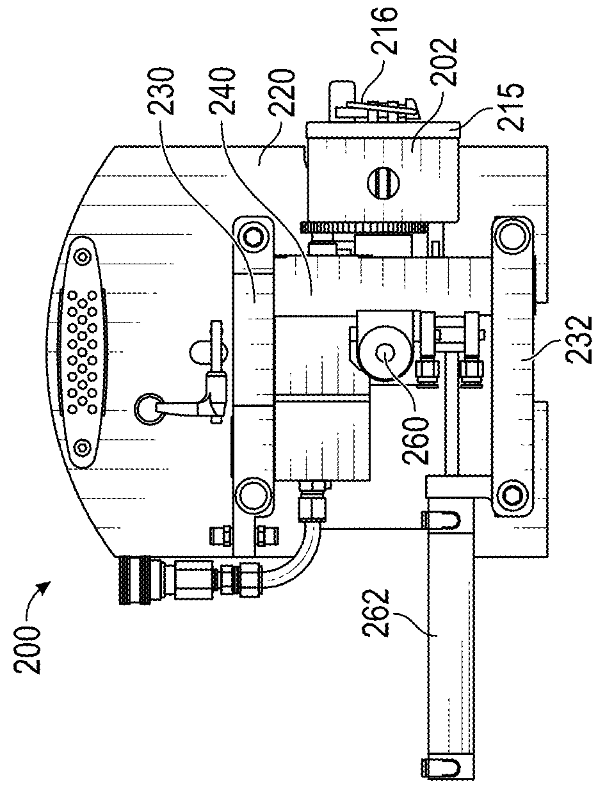
FIGS. 3B and 3C are views of a spool module for the NIRS of FIG. 1, shown with the spool module in spool and cutting positions, respectively.
Figure 3B:
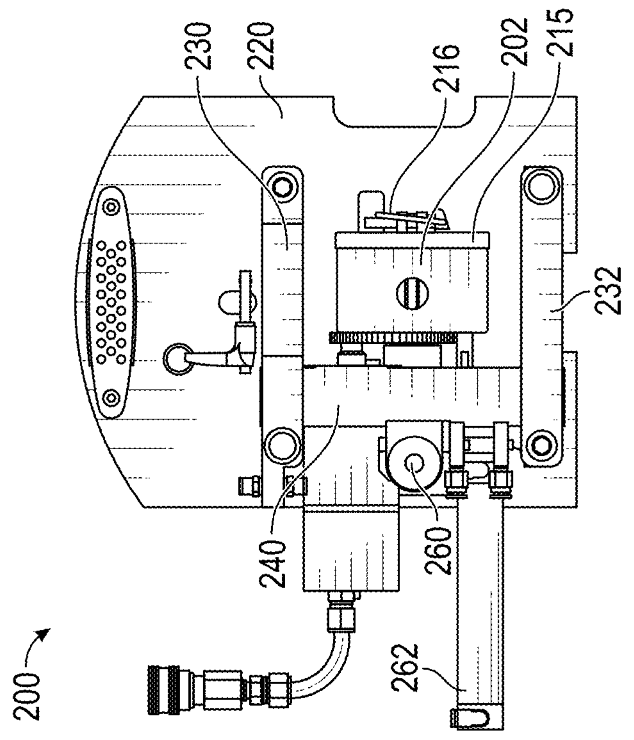

Referring to FIGS. 3A-3C, the spool module 200 includes the spool canister 202, a lid 215 (not shown in FIG. 3A, but see lid 215 in FIGS. 3B, 3C, and 8) configured to be coupled to the spool canister 202 in order to encapsulate the cold portion within the spool canister 202 after a tail of the LPRM 4 has been pulled into the spool canister 202, a drive shaft 208 associated with (e.g., configured to extend through and optionally be coupled to) the spool canister 202, a pin 216 (FIGS. 3B and 3C), the support brackets 230,232, a positioning slide 240, a pair of rails 242,244 coupled to the support brackets 230,232, a spool funnel 260 coupled to the drive shaft 208 and the positioning slide 240, and a pneumatic device (e.g., dual acting pneumatic cylinder 262) coupled to the positioning slide 240 and configured to be electrically connected to the programmable logic controller of the control system 50. The configuration of the spool module 200 advantageously allows the spool module 200 to spool the cold portion of the LPRM 4, and also move between positions to accommodate subsequent cutting of the hot portion of the LPRM 4.

Regarding spooling, the rails 242,244 extend through the through holes of the positioning slide 240, and allow the positioning slide 240 to properly position the drive shaft 208 in line with the LPRM 4, such as responsive to actuation of the pneumatic cylinder 262. In one example, the spool funnel 260, which is coupled to the drive shaft 208, extends through the positioning slide 240 in order for the drive shaft 208 to be properly positioned in line with the LPRM 4. In this manner, with the cold portion of the LPRM 4 aligned with the drive shaft 208, subsequent rotation of the drive shaft 208 causes the cold portion to be spooled in the spool canister 202.

After spooling the cold portion, the NIRS 2 is advantageously configured for quick and reliable cutting of the hot portion of the LPRM 4 with the feed and cut module 300, as will be discussed in great detail below. In one example, and continuing to refer to FIGS. 3B and 3C, the spool module 200 is configured to move between a spool position (FIGS. 3A and 3B) and a cutting position (FIG. 3C). Preferably, after the spooling operation has been completed, the pneumatic cylinder 262 is configured to be actuated by the programmable logic controller of the control system 50, and cause the positioning slide 240 and associated spool funnel 260 to move from the position shown in FIG. 3B to the position shown in FIG. 3C.

Figure 5C:
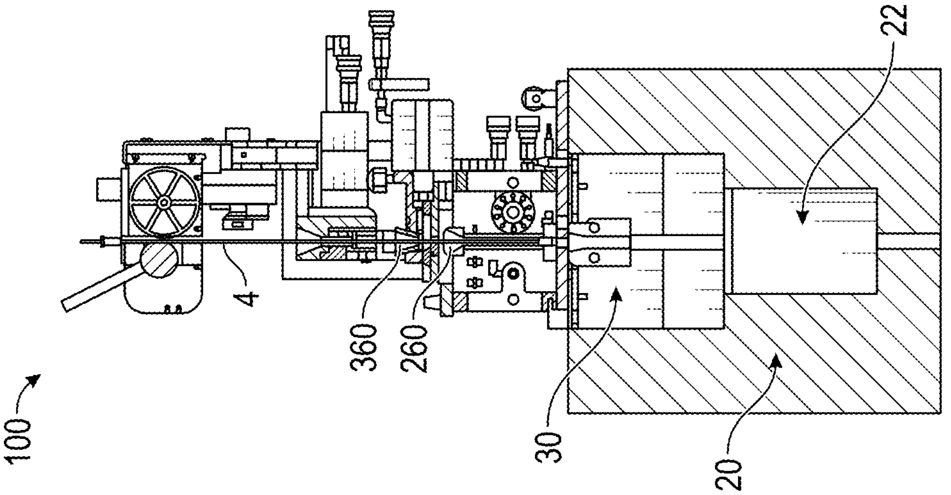
FIG. 5C is a section view of the instrument processing system shown in FIG. 5B.
Figure 5B:
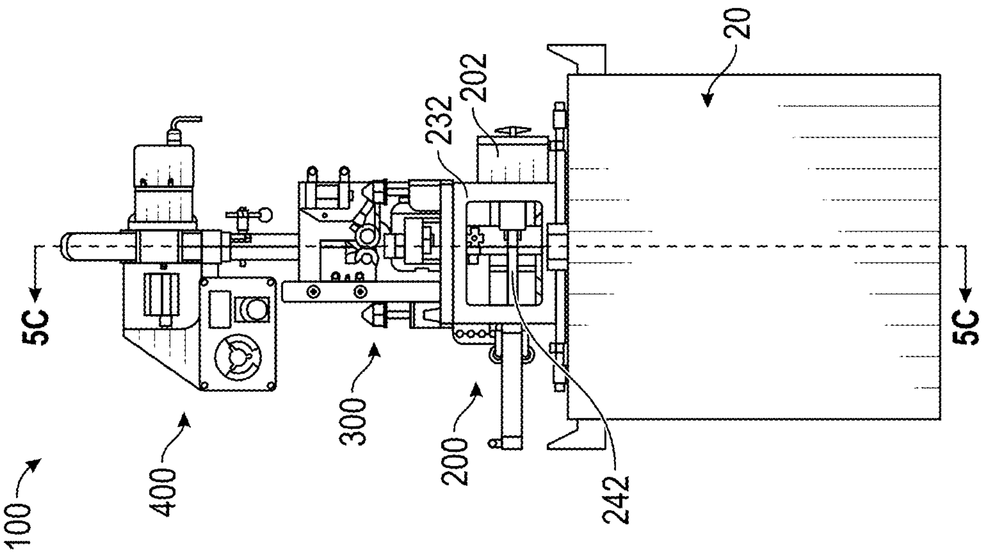
FIG. 5B is a side view of the instrument processing system for the NIRS of FIG. 1.

During this movement, the positioning slide 240 slides on the rails 242,244 in order to align the spool funnel 260 with a corresponding funnel 360 of the feed and cut module 300. Compare, for example, the position of the funnels 260,360 in FIG. 5A (e.g., a spooling position of the NIRS 2) with the position of the funnels 260,360 in FIG. 5C (e.g., a cutting position of the NIRS 2), which is a section view of FIG. 5B. As shown in FIG. 5C, the funnels 260 are aligned such that they preferably have a common center line, with the spool funnel 260 having been moved into the alignment position after the spooling operation has been completed, and responsive to actuation of the pneumatic cylinder 262. In the cutting position (e.g., FIG. 5C), the segments of the hot portion of the LPRM 4 are preferably configured to be cut by the feed and cut module 300, and pass through both of the funnels 260,360 before entering the cask plug 30 and passing into the canister 22. In this manner, the spooling operation can be configured such that the spool funnel 260 may be aligned with a cutting path in order to allow segments of the LPRM 4 to fall into the drop out canister 22.

In other words, the spool module 200 is configured to move between a spool position corresponding to the first and second funnels 260,360 not being aligned in order that the cold portion of the LPRM 4 can be spooled within the canister 202, and a cutting position corresponding to the first and second funnels 260,360 being aligned in order that a hot portion of the LPRM 4 can be cut into segments by the feed and cut module 300 and passed through both of the first and second funnels 260,360. Additionally, the pneumatic cylinder 262 is preferably configured to cause the spool module 200 to move between these two positions, responsive to actuation from the control system 50.

Referring again to FIG. 3A, the drive shaft 208 is preferably configured with a pair of shaft segments 209,210 that are preferably located parallel to one another and define a slot therebetween. The spool canister 202 may have a cylindrical-shaped wall 203 that has a through hole 204 extending therethrough. In one example, the LPRM 4 is pulled through the through hole 204 while the cold portion is spooled within the spool canister 202.

Specifically, once the operator has directed the LPRM 4 through the counter module 400 and the feed and cut module 300, the operator can then direct the LPRM 4 through the through hole 204 of the spool canister 202, and also through the slot between the shaft segments 209,210. Subsequently, the operator can couple the lid 215 (FIG. 8) to the spool canister 202. When this is done, the shaft segments 208,209 preferably extend through the lid 215. This allows an operator to insert the pin 216 (FIG. 8) through each of the shaft segments 208,209 in order to secure the lid 215 to the spool canister 202 and the drive shaft 208.

Figure 8:
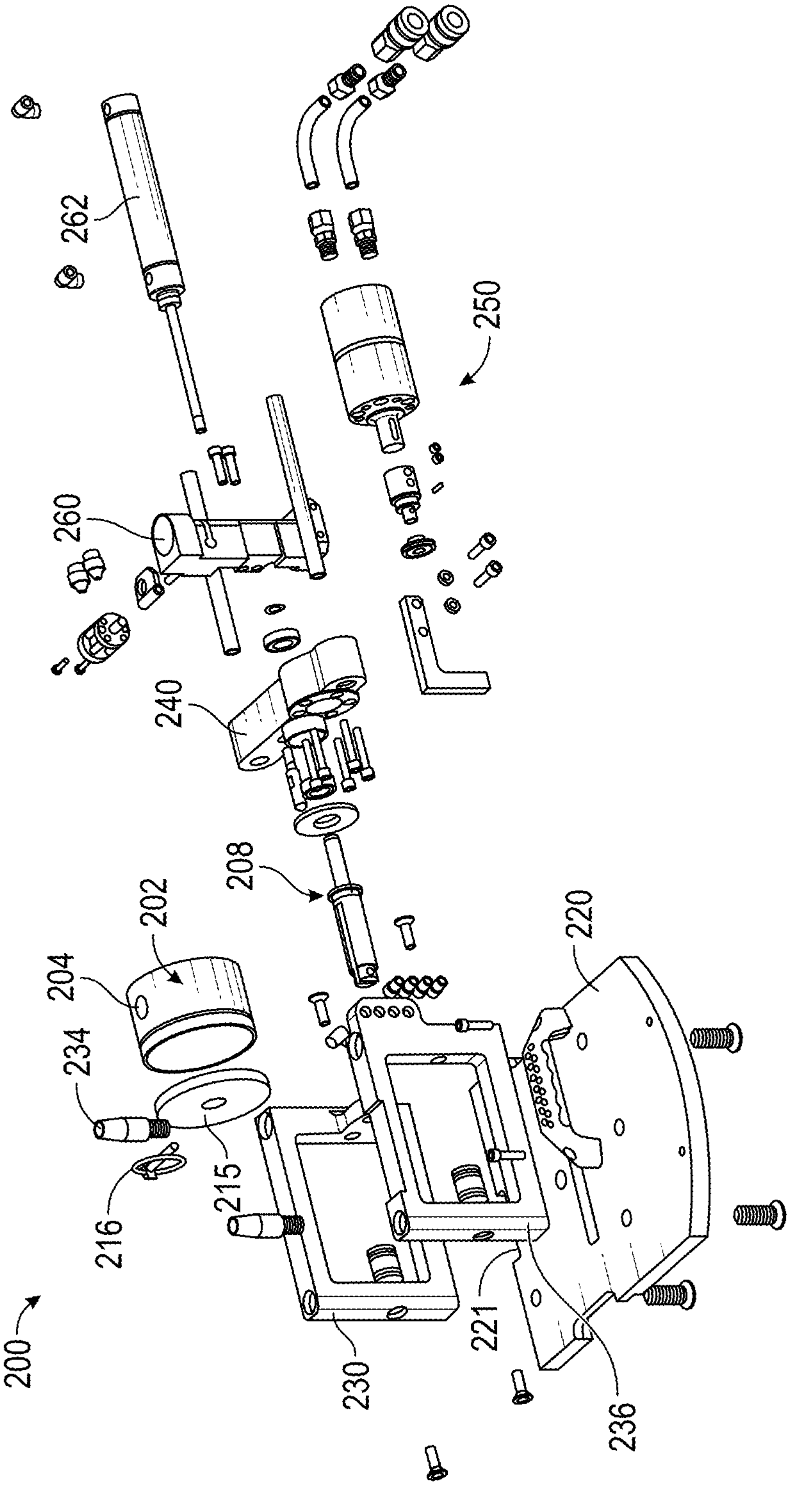
FIG. 8 is an exploded isometric view of a spool module for the instrument processing system of the NIRS of FIG. 4.

In one example, and as can be appreciated with reference to FIG. 8, the drive shaft 208 is coupled to a dual ball bearing pin arrangement, as well as a pin and gear assembly, which in turn in coupled to a hydraulic motor. That is, the spool module 200 further includes a drive mechanism 250 (FIG. 8) for hydraulically driving the drive shaft 208, and rotation of the drive shaft 208 responsive to actuation of the drive mechanism 250 by the control system 50 causes the cold portion to be spooled within the spool canister 202.

Accordingly, once the LPRM 4 is positioned within the spool canister 202 as depicted in FIG. 3A, and the lid 215 (FIG. 8) is secured to the spool canister 202 with the pin 216 (FIG. 8), the hydraulic motor is configured to cause the drive shaft 208 to rotate, which spools the “cold” portion of the LPRM 4 in a desirable manner, or rather, pulls the LPRM 4 around an axis of rotation of the drive shaft 208 with an end 5 (FIG. 3A) of the LPRM 4 having a fixed position with respect to the drive shaft 208. Accordingly, the cold portion has an end 5 configured to be received through each of the through hole 204 of the spool canister 202 and the slot of the drive shaft 208 in order to allow the cold portion to be spooled within the spool canister 202.

Initiation of the spooling sequence may be responsive to a worker pressing and holding the spool button 60 (FIG. 1) of the control system 50. During this time, encoders of the NIRS 2 validate a length of the LPRM 4 which is being spooled in the spool module 200. This is also reflected in a display of the counter module 400. Additionally, once the worker releases the spool button 60, the hydraulic motor preferably ceases to cause the drive shaft 208 to rotate. In this manner, the drive shaft 208 is configured to rotate about an axis in order to spool a cold portion of the LPRM 4 within the spool canister 202. Preferably, the spool module 200, via the drive shaft 208, is configured to receive the LPRM 4 after the LPRM 4 has passed through the feed and cut module 300, and thus allow for the aforementioned spooling.

When the control system 50 has validated that a predetermined length (e.g., a length corresponding to the “cold” portion of the LPRM 4) has been processed by the spool module 200, the operator can manually cut the LPRM 4 in order to separate a spooled portion (e.g., a “cold” portion) of the LPRM 4 from a non-spooled portion (e.g., a “hot” portion). At this stage, a tail of the spooled portion of the LPRM 4 will be sticking through the through hole 204 of the spool canister 202. Subsequently, responsive to the worker pressing the spool button 60 (FIG. 1) one more time, the drive shaft 208 rotates and the tail of the spooled portion of the LPRM 4 can be spooled or pulled into the spool canister 202, such that the entire spooled portion of the LPRM 4 is encapsulated within the spool canister 202 and the lid 215.

Accordingly, the drive shaft 208 is configured to rotate for a first period of time as the cold portion is spooled within the spool canister 202, and a second period of time after the first period of time. The feed and cut module 300 is configured to cut the cold portion between the first and second periods of time, and during the second period of time, the drive shaft 208 is configured to pull the tail portion of the cold portion into the spool canister 202. In one example, the portion of the LPRM 4 being spooled is preferably between 200-400 inches long, more preferably between 260-290 inches long, and most preferably between 270-280 inches long.

In order for an operator to know the desired length, such as to know that an entire “cold” portion of the LPRM 4 has been fully processed, the counter module 400 displays the length being fed into the instrument processing system 100. In one example, the counter module 400 measures a length of the LPRM 4 being fed into the instrument processing system 100, and then has a digital display 407 and/or a mechanical display 409 each for displaying the length. This dual counting feature (digital and/or mechanical) of the counter module 400 gives the operator a back-up failsafe to ensure that the irradiated location of the LPRM 4 is always known. Additionally, the control system 50 also has the display 60, and it is contemplated that the display 60 may also display the length of the LPRM 4 being fed into the instrument processing system 100.

After the spool sequence is satisfied (i.e., after the "cold" portion of the LPRM has been fully processed such that the "hot" portion is at a top of the instrument processing system 100), the spool module 200 moves to the cutting position while simultaneously opening the cask plug 30 to start accepting cut segments. The remaining portion of the LPRM 4 is automatically processed and disposed of into the drop out canister 22.

During cutting of the "hot" portion of the LPRM 4, a drive roller is pneumatically engaged to grip the "hot" end of the LPRM 4. The drive roller hydraulically feeds the LPRM 4 toward the hydraulically actuated cutter. The LPRM 4 is then cut into segments, optionally 1-3 inch segments, using an automatic timing sequence in the control system 50, and discharged directly into the cask 20. The LPRM detector, located at the end of the LPRM 4, is left intact and discharged into the cask 20 to complete the cycle. The NIRS 2 records a total number of cuts throughout the process to maintain inventory within the cask 20 and a number of other casks (not shown). This process may be used for all in-core positions requiring removal at a customer's site, which may, in one example, be less than 60 total positions in general. Upon completion, the instrument processing system 100 is preferably decontaminated to remove any loose radioactive particles, disassembled, and packaged for storage or shipment.

Figure 7A:
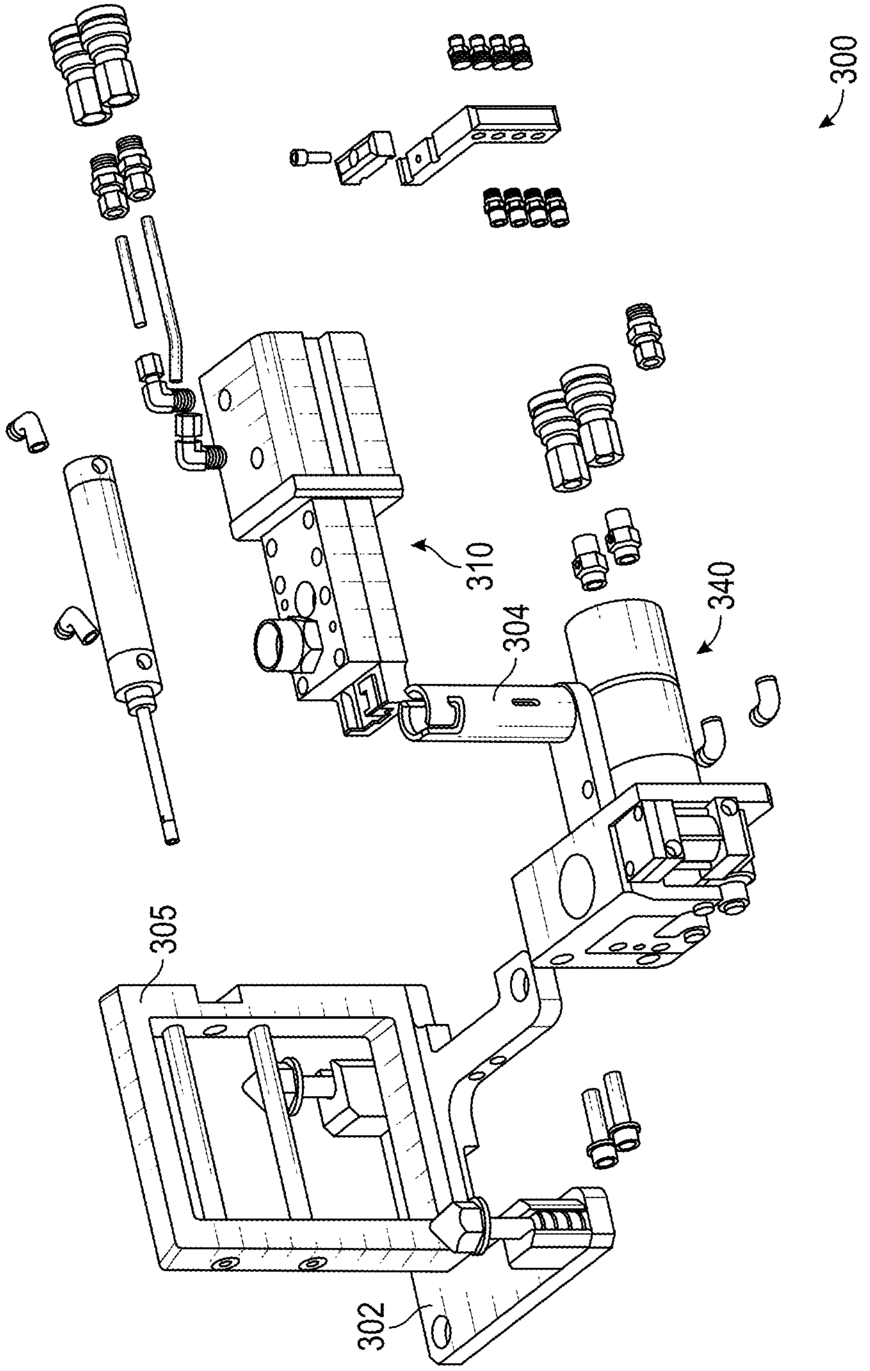
FIGS. 7A and 7B are exploded and more exploded isometric views, respectively, of a feed and cut module for the instrument processing system of the NIRS of FIG. 4.
Figure 7B:
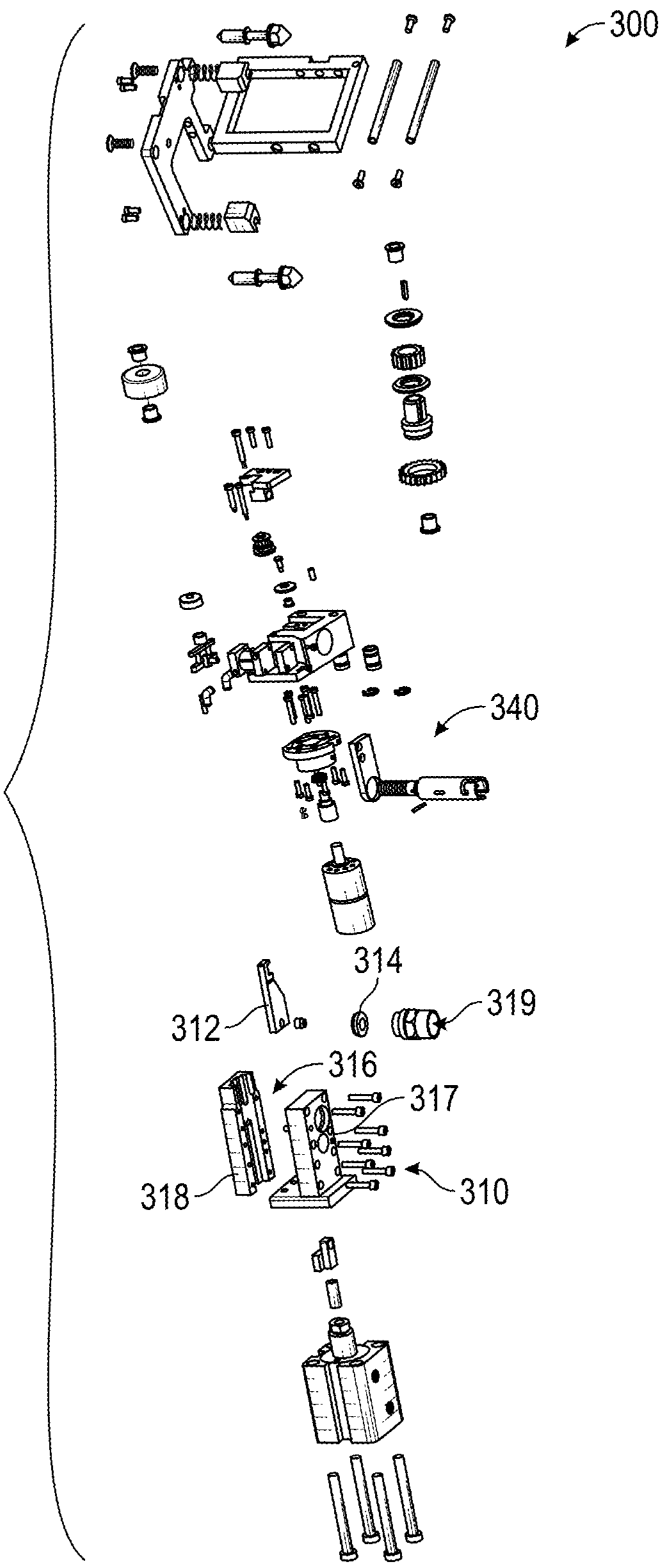

In one example, the feed and cut module 300 is a hydraulically operated cutter that is controlled logically by the control system 50. Referring to FIGS. 7A and 7B, the feed and cut control module 300 preferably includes the mounting plate 302, a support bracket 304 coupled to the mounting plate 302, a cutting assembly 310 coupled to the mounting plate 302 and the support bracket 304 (i.e., either directly or via intermediate components), as well as a drive mechanism (e.g., hydraulic mechanism) 340 coupled to the mounting plate 302 and the support bracket 304. The hydraulic mechanism 340 is associated with cutting elements 312,314 (discussed below) of the feed and cut module 300, and is controlled logically by the control system 50, such that the first and second feed motor buttons 56,58, or automatic operation via the control system 50, actuates a motor driven fixed position metallic (i.e., stainless steel) drive wheel and a second cammed metallic (i.e., stainless steel) cam wheel. These components then act as a follower that supports positioning and drive pressure. Furthermore, the design for both wheels incorporates a quick change-out process which may be performed locally and/or out of the water. The hydraulic mechanism 340 is partially open to allow for easy viewing of detector travel.

Additionally, in one example embodiment, the hydraulic mechanism 340 is mounted on rails of the feed and cut module 300 in order to allow the drive and follower wheels to be positioned in-line with cutting assembly 310, or pulled back out of the way (i.e., retracted) in order to allow access to the cutting elements 312,314 (discussed below) of the feed and cut module 300, such as for maintenance activities. This is preferably achieved via a drive positioning slide, which may be manually manipulated via a dual acting pneumatic cylinder. Moreover, the feed and cut module 300 preferably also includes a pinch wheel, which may be mounted to a cam linkage. In one example, the pinch wheel may support positioning and drive pressure of the LPRM 4. The cam may be manually actuated via a dual acting pneumatic cylinder.

Continuing to refer to FIGS. 7A and 7B, the cutting assembly 310 of the feed and cut module 300 preferably includes a first cutting element 312, a second cutting element (e.g., round blade 314) coupled to the first cutting element 312, and a housing 316 configured house the first cutting element 312 and the round blade 314. The round blade 314 is preferably located in a counter bore in a first element 317 of the housing 316, and is configured to be held in place with a mounting member 319 via blunt start coarse threads such that as the first cutting element 312 slides between positions (e.g., via the hydraulic mechanism 340), the hot portion of the LPRM 4 can be cut into the small segments with a cutting edge of at least one of the first and second cutting elements 312,314.

Accordingly, the housing 316, which includes the first element 317, and a second element 318, preferably acts as a guide for the first cutting element 312, and is configured such that the first and second elements 317,318 are coupled together via coupling members (e.g., without limitation, socket head ca screws). In one example, the first cutting element 312 is slidably coupled to the housing 316 and is configured to slide between positions via the hydraulic mechanism 340 in order to cut the LPRM 4 into small segments with a cutting edge of at least one of the first and second cutting elements 312,314. Accordingly, responsive to actuation of the control system 50, the instrument processing system 100 is configured to move from a first operating mode corresponding to the cold portion being spooled within the spool canister 202, to a second operating mode later in time corresponding to a hot portion of the LPRM 4 being cut by the feed and cut module 300 into small segments for disposal into the cask assembly (e.g., the cask 20, the canister 22, and the cask plug 30).

The feed and cut module 300 may be operated either in a manual mode or an automatic mode. With the feed and cut module 300 in a manual mode, the distance from cut to cut of the LPRM 4 is dependent on the operator. With the feed and cut module 300 in an automatic mode, the distance from cut to cut of the LPRM 4 can be set to a predetermined length determined by a customer. In a preferred embodiment, the third cutting element 316 is a sliding blade design that is actuated via a dual acting hydraulic cylinder. The first and second cutting elements 312,314 may be made from a hardened tool steel material. Additionally, in one example the first and second cutting elements 312,314 may function without need for replacement throughout an entire segmenting campaign, at least because the first and second cutting elements 312,314 are made from materials that are substantially harder and more durable than the LPRM 4, or other materials that are being cut.

Figure 7C:
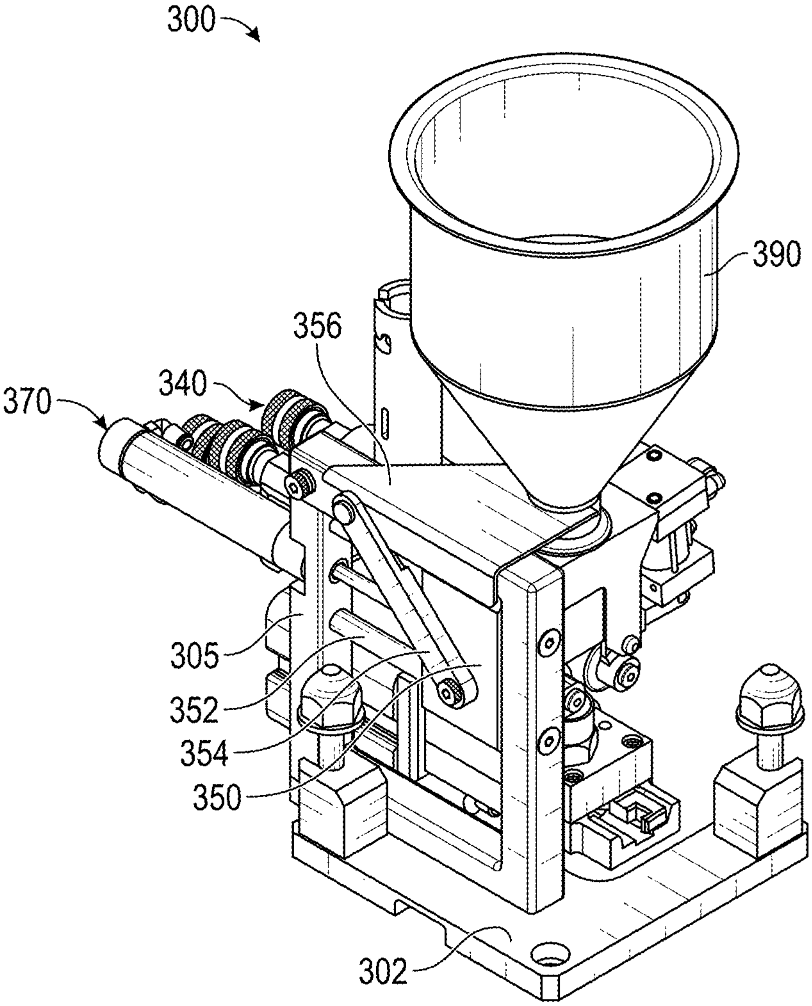
FIGS. 7C and 7D are assembled isometric views of the feed and cut module of FIGS. 7A and 7B, shown with an auxiliary funnel in a first and second position, respectively.
Figure 7D:
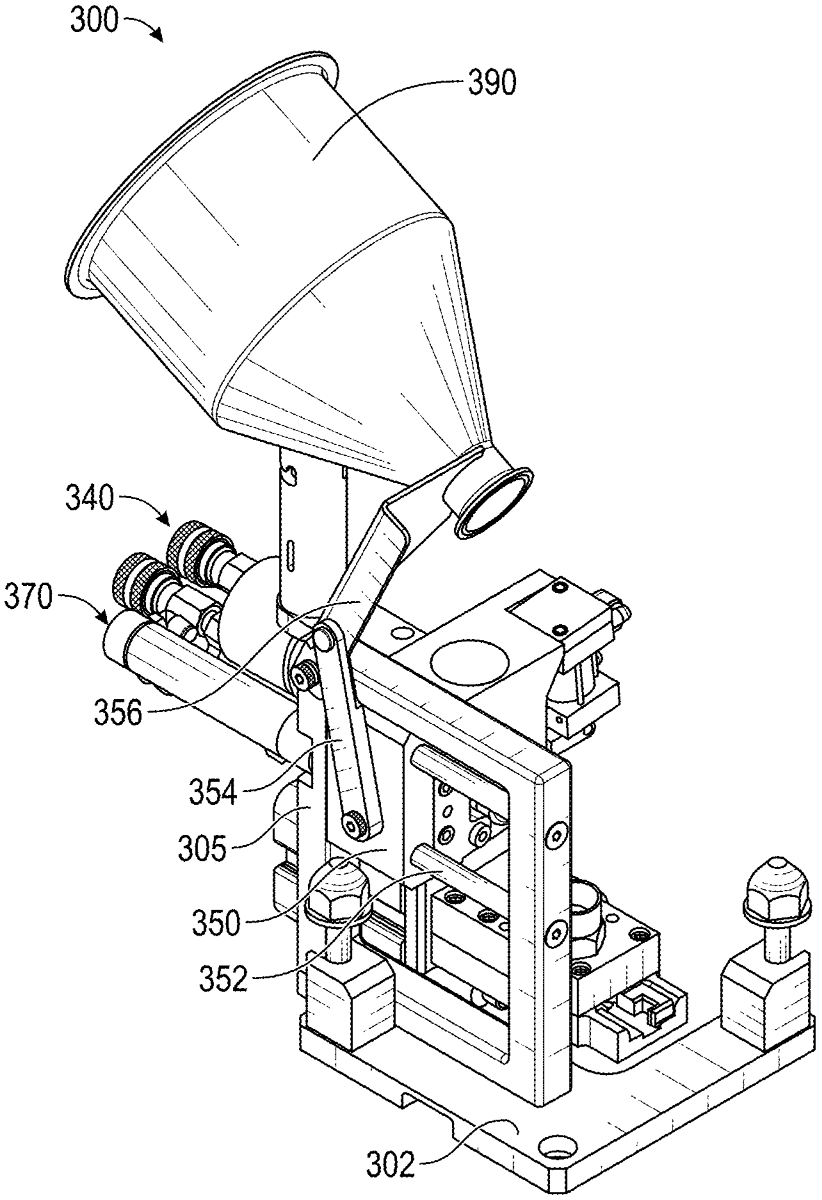

Additionally, and referring to FIGS. 7C and 7D, for PWR combustion engineering designed plants, an auxiliary funnel 390 is configured to be employed with the feed and cut module 300, which may be installed underwater, optionally 30 feet underwater, onto a fuel sized debris can. The relatively large auxiliary funnel 390 is preferably used in order to help workers remotely insert ICIs into a feed wheel of the feed and cut module 300. The funnel 390 is preferably coupled as part of the feed and cut module 300, such as at an associated feed mechanism, and thus forms part of the feed and cut module 300, in the example of FIGS. 7C and 7D. In this manner, the NIRS 2 includes the feed and cut module 300 in a manner wherein the feed and cut module 300 is operated independently of the spool and counter modules 200,400. Accordingly, when the funnel 390 is de-coupled from the rest of the feed and cut module 300, the feed and cut module 300 is configured for use in the NIRS 2.

Additionally, as shown, the funnel 390 preferably swings and/or rotates out of the way in order to allow for underwater changes of the first and second cutting elements 312,314. This provides users with several advantages. One, it allows the funnel 390 to be relatively large, thereby making alignment of the LPRM 4 with the first and second cutting elements rather simple. Two, by being retractable, access to the first and second cutting elements, such as to change out these tools after a cutting operation, is much simpler, as compared to known arrangements in which funnels are fixedly connected to cutters.

More specifically, as shown in FIGS. 7C and 7D, the feed and cut module 300 preferably includes a mounting assembly in the form of the mounting plate 302 and a mounting bracket 305 coupled to the mounting plate, a hydraulic mechanism 340 coupled to at least one of the mounting plate 302 and the mounting bracket 305, and an actuation mechanism (e.g., pneumatic device 370) coupled to the mounting bracket 305 and the funnel 390. As discussed, the funnel 390 is preferably configured to move between a first position and a second position, with the first position corresponding to the funnel 390 being aligned with the first and second cutting elements (shown, but not labeled in FIGS. 7C and 7D), and with the funnel 390 pivoting away from the first and second cutting elements responsive to actuation of the pneumatic device 370 when moving from the first position to the second position. This movement of the funnel 390 is achievable via additional components of the feed and cut module 300 depicted in FIGS. 7C and 7D, namely a slide member 350, a number of guide rails 352, and a linkage member 354. The guide rails 352 are coupled to the mounting bracket 305, and each extend through the slide member 350. Furthermore, the pneumatic device 370 is configured to cause the slide member 350 to slide on the guide rails 352, thereby moving the linkage member 354 and causing the funnel 390 to move between the first and second positions.

Even more specifically, the feed and cut module 300 depicted in FIGS. 7C and 7D further includes a plate member 356 fixedly coupled to the funnel 390, and the linkage member 354 preferably has a first end and a second end each rotatably coupled to a corresponding one of the slide member 350 and the plate member 356. In this manner, when the funnel 390 moves from the first position to the second position, the plate member 356 disengages the mounting bracket 305, thereby allowing access to the first and second cutting elements (FIG. 7B).

Additionally, the control system 50 in such a situation may be positioned on a refuel floor at a safe distance away for radiological safety precautions. ICIs (not shown) may be removed using pole-mounted tooling underwater and transferred to the NIRS 2 to begin the segmentation process. The ICIs may be funneled into the feed and cut module 300. The drive roller may be engaged to grip and drive the ICIs, and subsequently the ICIs may be cut into 6" segments using an automatic timing sequence in the control system 50, and then discharged directly into the debris can. Similarly, this process is re-iterated as needed, decontaminated, then disassembled and packaged for storage/shipment.

For certain PWR plants, flux thimbles (not shown) may be manually pushed through the core plate prior to installing the instrument processing system 100. The instrument processing system 100 would be then oriented with an integral funnel facing down and installed onto the protruding flux thimbles through the core plate. The drive roller may then be engaged to grip and drive the flux thimble upwards until an air-operated funnel tool can grip the end. Subsequently, the "hot" ends are cut into three 10-foot segments, which may be transferred with the funnel tool to a fuel-sized debris can for disposal. The remaining "cold" end is released from the NIRS 2 and withdrawn from the water and segmented on the refuel floor within a disposal container. Similarly, this process is re-iterated as needed, decontaminated, then disassembled and packaged for storage/shipment.

Figure 9:
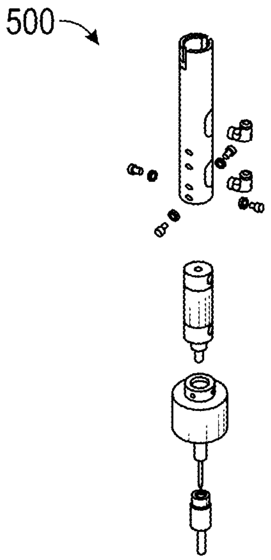
FIGS. 9-11 are an exploded isometric view of a first tool, an exploded isometric view of a second tool, and an assembled isometric view of a second tool, for use with the instrument processing system of the NIRS of FIG. 4.
Figure 10:
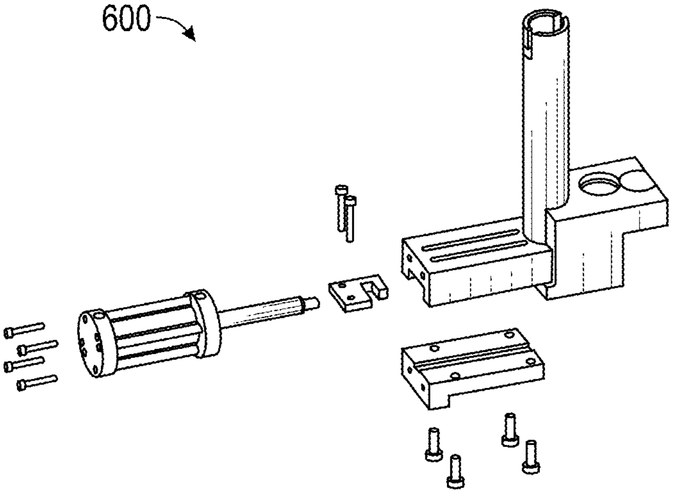
Figure 11:
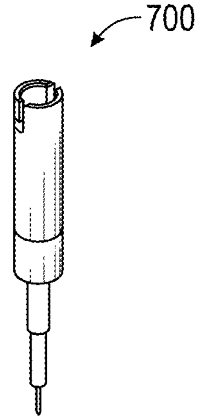

For all applications, the NIRS 2 comes with remote tooling capable of removing and/or replacing the shear blades. All tooling is provided with J-lock adapters for use with J-lock poles used for underwater work within the nuclear industry. FIGS. 9-11 illustrate first, second, and third tools 500,600,700 that may be used in this regard.

The first tool 500 depicted in FIG. 9 is a round blade tool configured to pull a round blade out of the feed and cut module 300. Additionally, the first tool 500 is preferably an air operated (i.e., double acting) tool that is used to remove and install, locally and remotely (underwater), the Round Blade and Capture Nut of the feed and cut module 300. The first tool 500 can be operated underwater using a tapeless pole system (not shown), and may be manually manipulated via a dual acting pneumatic cylinder.

The second tool 600 depicted in FIG. 10 is a sliding blade tool configured to pull a sliding blade (i.e., the third cutting element 316 (FIG. 7B) out of the feed and cut module 300. The second tool 600 is preferably an air operated (i.e., double acting) tool that is used to remove and install, locally and remotely (underwater) the sliding blade (i.e., the third cutting element 316, shown in FIG. 7B) of the feed and cut module 300. The second tool 600 may be operated underwater using a tapeless pole system (not shown), and may be manually manipulated via a dual acting pneumatic cylinder.

The third tool 700 depicted in FIG. 11 is a hex tool, which may be of an Allen Wrench type nature, and configured to mount to a J-Lock adapter. Preferably, the third tool 700 may be used to change the sliding blade, the drive wheel, and cam wheels of the feed and cut module 300.

In one example, an additional tool in the form of a camera may be employed with the NIRS 2. The camera may be a stand alone PTZ (pan, tilt, zoom) with a monitor and controls located at or near the control system 50. In one example, the camera is configured to verify mechanical counter concurrence of the counter module 400.

Figure 12A:
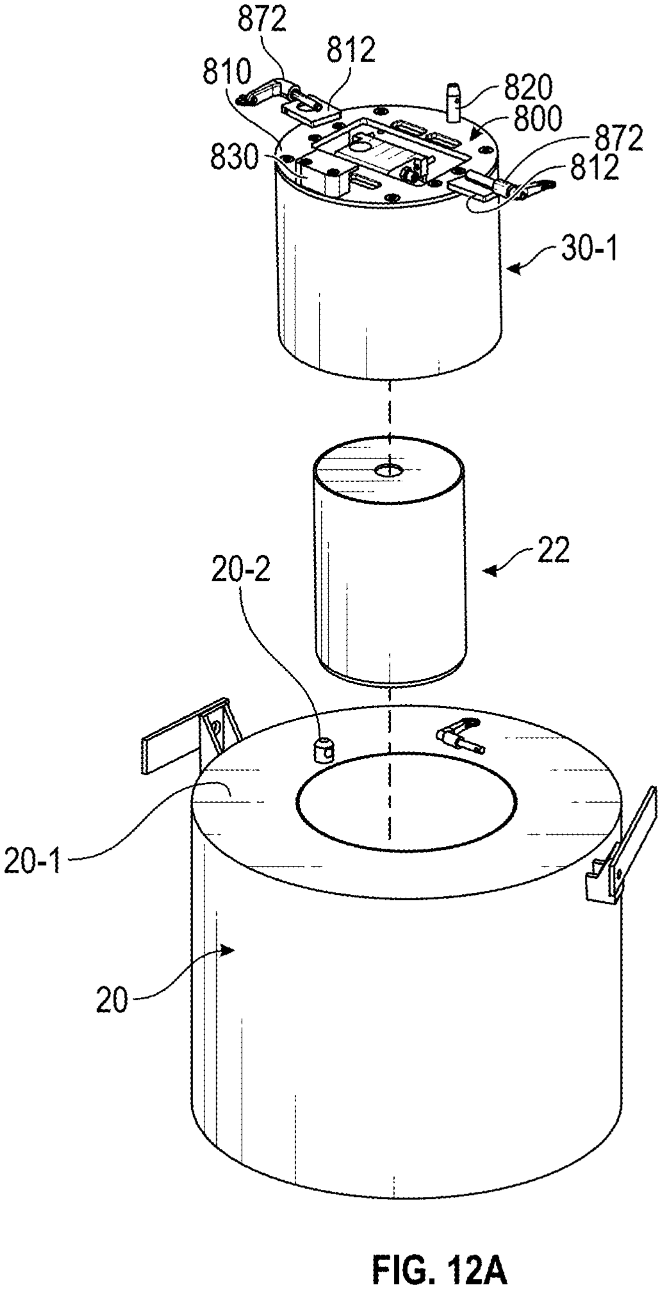
FIGS. 12A and 12B are exploded and assembled isometric views, respectively, of a cask, a canister, and a cask plug, and shown with an adapter plate and locking members, in accordance with one non-limiting embodiment of the disclosed concept.

Referring to FIGS. 12A-14C, the disclosed concept also contemplates safe and effective storage and transport of the hot portions of the LPRM 4 once they have been segmented and disposed within the canister 22. For example, FIGS. 12A and 12B show an adapter plate 800 coupled to a cask plug 30-1. The adapter plate 800 advantageously allows for universal mounting of a cask plug 30-1 to the canister 22. The adapter plate 800 has a plate member 810, a pair of opposing coupling members 812 each preferably located on an opposing side of, and being secured to, the plate member 810. In one example, the adapter plate 800 further includes a pin member 820 and a mounting structure 830 each extending upwardly from the plate member 810.

Figure 12B:
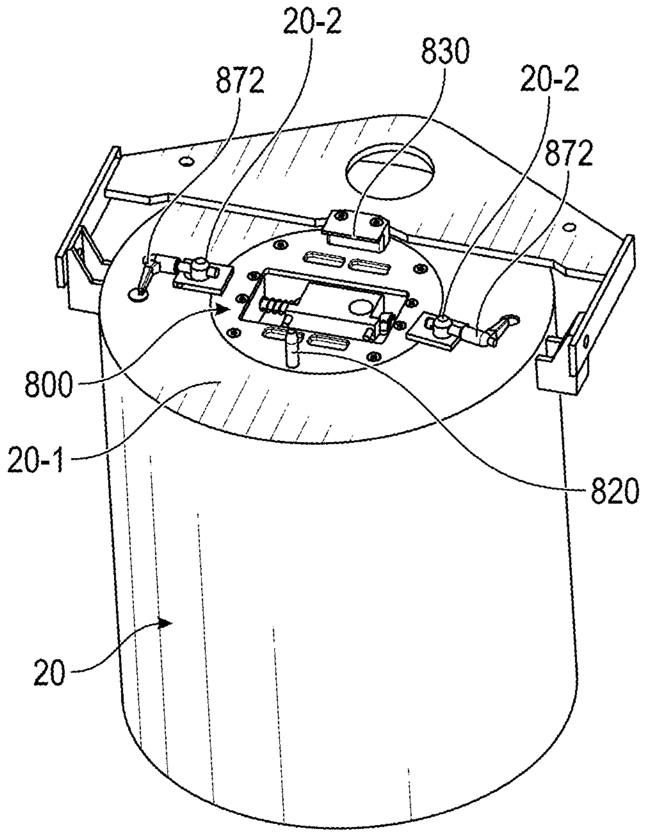

Referring to FIG. 12B, the cask 20 has a top surface 20-1 and a number of pin members 20-2 extending upwardly from the top surface 20-1. In one example, the pin members 20-2 are each configured to extend through the through holes of the coupling members 812 so that locking members 872 can extend through the pin members 20-2 of the cask 20, and lock the adapter plate 800 to the cask plug 30-1. Moreover, the cask 20 and cask plug 30-1 each preferably have first sizes. The through holes of the coupling members 812 are advantageously sized and configured to allow the adapter plate 800 to be employed with other casks and cask plugs (not shown) having second sizes different than the first size. In other words, the adapter plate 800 is universal in that it is configured be used with a plurality of differently sized casks and cask plugs.

Figure 13A:
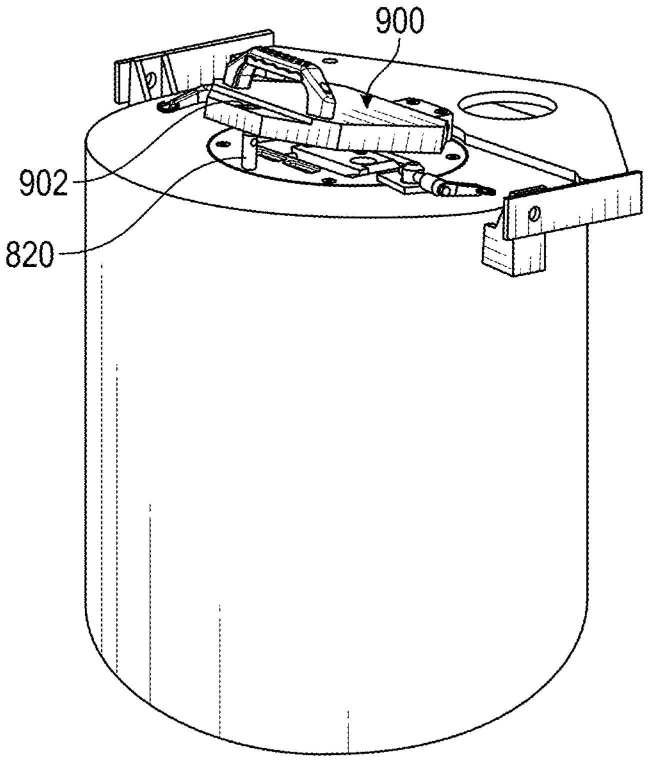
FIGS. 13A and 13B show the assembly of FIG. 12B as employed with a locking plate being assembled onto the cask, and fully assembled and locked onto the cask, respectively.
Figure 13B:
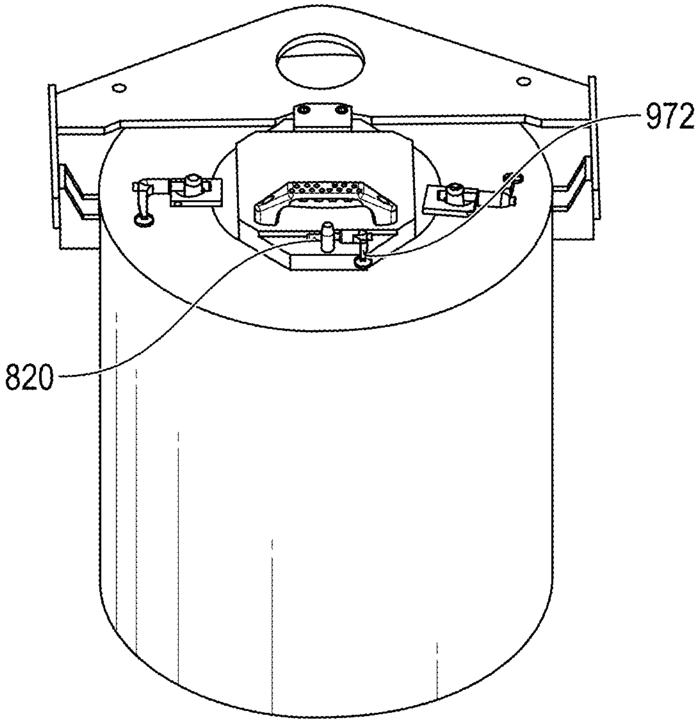

Additionally, it is also contemplated that the adapter plate 800, and associated canister 22 and cask plug 30-1, can be locked to the cask 20 via a locking plate member 900. This is depicted in FIGS. 13A and 13B. As shown in FIG. 13A, the locking plate member 900 is positioned underneath the mounting structure 830 of the adapter plate 800, and then lowered so that the pin member 820 of the adapter plate 800 can be extended through a through hole 902 of locking plate member 900. Subsequently, a locking member 972 can be extended through a through hole of the pin member 820 in order to lock the locking plate member 900 onto the adapter plate 800. In this manner, the segmented hot portion within the canister 22 can be safely and reliably transported, thus protecting operators from dangerous exposure.

Figure 14A:
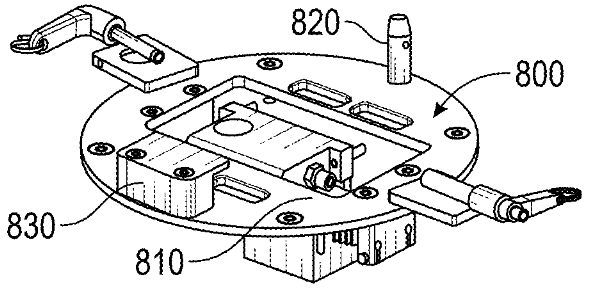
FIGS. 14A, 14B, and 14C show the adapter plate of FIGS. 12A and 12B with locking members, a grapple member, and the locking plate of FIGS. 13A and 13B, respectively.
Figure 14B:
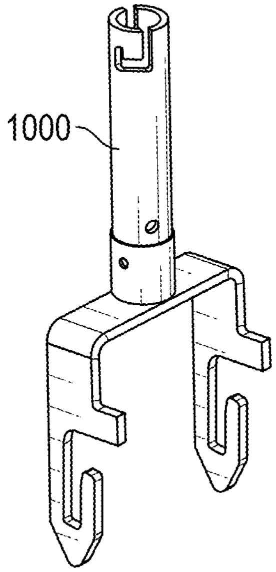
Figure 14C:
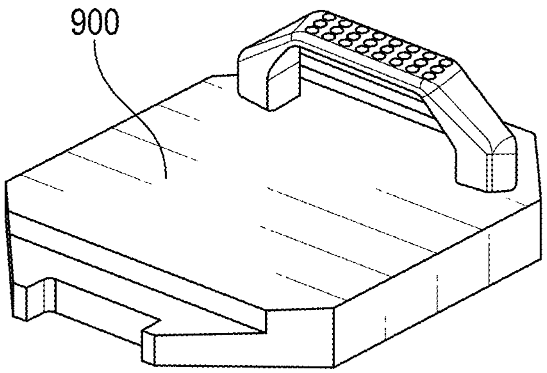

FIGS. 14A-14C show isometric views of the adapter plate 800, a grapple member 1000, and the locking plate member 900, respectively. The grapple member 1000 is configured to be employed to grip and manipulate the adapter plate 800, in order to secure the adapter plate 800 to the cask plug 30-1.

Accordingly, one example method of employing the disclosed concept includes positioning the instrument processing system 100 on the cask 20, feeding a first portion of the LPRM 4 into the instrument processing system 100, spooling a cold portion of the LPRM 4 into the spool canister 202 responsive to activating the control system 50, cutting the cold portion of the LPRM 4, and segmenting a hot portion of the LPRM 4 into the cask 20 after the cold portion has been spooled into the spool canister 202 and separated from the hot portion. Other method steps are also contemplated herein, including spooling a tail of the cold portion of the LPRM 4 into the spool canister 202 after cutting the LPRM 4, in order that the spooled portion of the LPRM 4 is entirely encapsulated by the spool canister 202 and the lid 215. Another method step includes segmenting the hot portion of the LPRM 4 into segments between 1-3 inches. Further, it is contemplated that the counter module 400 of the instrument processing system may digitally and mechanically count a length of the LPRM 4 being fed into the instrument processing system 100 and passing through the counter module 400, in order to allow a worker to know how much of the LPRM 4 has been processed. Additionally, positioning the instrument processing system 100 may include removably aligning and coupling the spool module 200 onto cask 20 by positioning mounting structures 36,221 of the cask plug 30 and the spool module 200 with each other, and doing the same to removably mount the feed and cut module 300 to the spool module 200, and to mount the counter module 400 to the feed and cut module 300.

In one example, it will be appreciated that a method of processing a nuclear instrument (e.g., the LPRM 4) with the NIRS 2, comprises providing the NIRS 2; receiving the LPRM 4 with the counter module 400 and optionally counting a length of the LPRM 4 passing through the counter module 400; receiving the LPRM 4 with the feed and cut module 300 after the LPRM 4 has passed through the counter module 400; receiving the LPRM 4 with the spool module 200 after the LPRM 4 has passed through the feed and cut module 300; and rotating the drive shaft 208 about an axis in order to spool a cold portion of the LPRM 4 within the spool canister 202. The method may further include rotating the drive shaft 208 for a first period of time as the cold portion is spooled within the spool canister 202; cutting the cold portion after the first period of time with the feed and cut module 300; and rotating the drive shaft 208 for a second period of time after the cold portion has been cut by the feed and cut module 300 in order to pull a tail portion of the cold portion into the spool canister 202. Additionally, the method may also include providing the spool module 200 with a lid 215 coupled to the spool canister 202; and extending the drive shaft 208 through each of the spool canister 202 and the lid 215 in order to encapsulate the cold portion within the spool canister 202 after the second period of time. Moreover, the method may also include hydraulically driving the drive shaft 208 with the drive mechanism 250; and spooling the cold portion within the spool canister 202 by rotating the drive shaft 208 responsive to actuation of the drive mechanism 250 by the control system 50.

In yet a further example, the method also includes responsive to actuation of the control system 50, moving the instrument processing system 100 from a first operating mode corresponding to the cold portion being spooled within the spool canister 202, to a second operating mode later in time corresponding to a hot portion of the LPRM 4 being cut by the feed and cut module 300 into small segments for disposal into the cask assembly (e.g., the cask 20, the canister 22, and the cask plug 30). Finally, the method may also include coupling the adapter plate 800 to the cask plug 30-1, wherein the adapter plate 800 is configured to be coupled to a second cask plug (not shown) having a second size different than the first size of the first cask plug 30-1; and after the hot portion of the LPRM 4 has been cut into small segments by the feed and cut module 300 and disposed into the canister 22 of the cask assembly (e.g., the cask 20, the canister 22, and the cask plug 30-1), locking the locking plate member 900 to the cask assembly in order to prevent access to the small segments within the canister 22.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A nuclear instrument removal system (NIRS) for use with processing a nuclear instrument, the NIRS comprising:
  - a control system; and
  - an instrument processing system configured for use with the control system, the instrument processing system comprising:
    - a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the canister has a through hole through which the nuclear instrument is pulled while the cold portion is spooled within the canister, wherein the drive shaft is configured to rotate for a first period of time as the cold portion is spooled within the canister, and a second period of time after the first period of time, wherein the feed and cut module is configured to cut the cold portion between the first and second periods of time, and wherein, during the second period of time, the drive shaft is configured to pull a tail portion of the cold portion into the canister, wherein the spool module further comprises a lid coupled to the canister, wherein the drive shaft extends through each of the canister and the lid in order to encapsulate the cold portion within the canister after the second period of time.

2. A nuclear instrument removal system (NIRS) for use with processing a nuclear instrument, the NIRS comprising:

a control system; and an instrument processing system configured for use with the control system, the instrument processing system comprising:

a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the spool module further comprises a first funnel coupled to the drive shaft, wherein the feed and cut module comprises a second funnel, and wherein the spool module is configured to move between a spool position corresponding to the first and second funnels not being aligned in order that the cold portion can be spooled within the canister, and a cutting position corresponding to the first and second funnels being aligned in order that a hot portion of the nuclear instrument can be cut into segments by the feed and cut module and passed through both of the first and second funnels.

3. The NIRS according to claim 2, wherein the spool module further comprises a pneumatic device coupled to the first funnel and electrically connected to the control system, and wherein the pneumatic device is configured to cause the spool module to move between the spool and cutting positions, responsive to actuation from the control system.

4. The NIRS according to claim 2, wherein the spool module further comprises a drive mechanism for hydraulically driving the drive shaft, and wherein rotation of the drive shaft responsive to actuation of the drive mechanism by the control system causes the cold portion to be spooled within the canister.

5. The NIRS according to claim 2, wherein the counter module comprises at least one of a digital display and a mechanical display each for displaying the length of the nuclear instrument passing through the counter module.

6. The NIRS according to claim 2, wherein the control system is connected to the instrument processing system by a connection selected from the group consisting of a wireless connection and an electrical connection, and wherein the control system is configured to independently control operation of each of the counter module, the feed and cut module, and the spool module.

7. A nuclear instrument removal system (NIRS) for use with processing a nuclear instrument, the NIRS comprising:

a control system; and an instrument processing system configured for use with the control system, the instrument processing system comprising:

a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the drive shaft comprises a first shaft segment and a second shaft segment, wherein the drive shaft has a slot between the first and second shaft segments, wherein the canister has a through hole, and wherein the cold portion has an end configured to be received through each of the through hole of the canister and the slot of the drive shaft in order to allow the cold portion to be spooled within the canister.

8. A nuclear instrument removal system (NIRS) for use with processing a nuclear instrument, the NIRS comprising:

a control system; and an instrument processing system configured for use with the control system, the instrument processing system comprising:

a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the spool module further comprises a mounting plate, a first support bracket coupled to the mounting plate, a second support bracket coupled to the mounting plate, a positioning slide, a first rail coupled to the first support bracket and extending through the positioning slide, and a second rail coupled to the second support bracket and extending through the positioning slide, and wherein the drive shaft extends through the positioning slide in order for the drive shaft to be properly positioned in line with the nuclear instrument.

9. A nuclear instrument removal system (NIRS) for use with processing a nuclear instrument, the NIRS comprising:

a control system; and an instrument processing system configured for use with the control system, the instrument processing system comprising:

a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the spool module further comprises a mounting plate having a grooved region and an opening each configured to receive a corresponding one of a mounting structure and a pin, respectively, of the cask assembly.

10. The NIRS according to claim 9, wherein the feed and cut module comprises a mounting plate having a number of openings, wherein the spool module further comprises a first support bracket coupled to the mounting plate of the spool module, a second support bracket coupled to the mounting plate of the spool module, and a number of protrusions extending from or being coupled to least one of the first and second support brackets and configured to extend into the number of openings of the mounting plate of the feed and cut module in order to removably couple to the feed and cut module to the spool module.

11. The NIRS according to claim 10, wherein the feed and cut module comprises a coupling member coupled to the mounting plate of the feed and cut module, and wherein the counter module comprises a guide member having a shaft portion configured to be removably coupled to the coupling member of the feed and cut module with one of the coupling member and the shaft portion extending into the other of the coupling member and the shaft portion.

12. The NIRS according to claim 9, wherein the spool module further comprises a drive mechanism for hydraulically driving the drive shaft, and wherein rotation of the drive shaft responsive to actuation of the drive mechanism by the control system causes the cold portion to be spooled within the canister.

13. The NIRS according to claim 9, wherein the counter module comprises at least one of a digital display and a mechanical display each for displaying the length of the nuclear instrument passing through the counter module.

14. The NIRS according to claim 9, wherein the control system is connected to the instrument processing system by a connection selected from the group consisting of a wireless connection and an electrical connection, and wherein the control system is configured to independently control operation of each of the counter module, the feed and cut module, and the spool module.

15. A nuclear instrument removal system (NIRS) for use with processing a nuclear instrument, the NIRS comprising:

a control system; and an instrument processing system configured for use with the control system, the instrument processing system comprising:

a counter module configured to receive the nuclear instrument, a feed and cut module removably coupled to the counter module and configured to receive the nuclear instrument after passing through the counter module, and a spool module removably coupled to the feed and cut module and configured to be mounted to a cask assembly, the spool module comprising a spool canister and a drive shaft associated with the canister, the drive shaft being configured to rotate about an axis in order to spool a cold portion of the nuclear instrument within the canister, wherein the feed and cut module comprises a hydraulic mechanism and a cutting assembly associated with the hydraulic mechanism, wherein the cutting assembly comprises a first cutting element, a second cutting element coupled to the first cutting element, and a housing configured to house the first and second cutting elements, wherein the first cutting element is slidably coupled to the housing and is configured to slide between positions via the hydraulic mechanism, wherein the second cutting element is disposed in a counter bore of the housing, and is configured to be held in place as the first cutting element slides between positions via the hydraulic position in order to allow a hot portion of the nuclear instrument to be cut into the small segments with a cutting edge of at least one of the first and second cutting elements.

* * * * *